United States Patent
Fischer et al.

(10) Patent No.: US 8,057,103 B2
(45) Date of Patent: Nov. 15, 2011

(54) ROLLER BEARING OF A WHEEL HUB WITH A VENTURI NOZZLE FOR A TIRE PRESSURE CONTROL SYSTEM

(75) Inventors: Raphael Fischer, Schweinfurt (DE); Christian Hecker, Schweinfurt (DE); Peter Niebling, Bad Kissingen (DE)

(73) Assignee: Schaeffler KG, Herzogenaurach (DE)

( * ) Notice: Subject to any disclaimer, the term of this patent is extended or adjusted under 35 U.S.C. 154(b) by 319 days.

(21) Appl. No.: 12/444,865

(22) PCT Filed: Sep. 15, 2007

(86) PCT No.: PCT/DE2007/001669
§ 371 (c)(1), (2), (4) Date: Jun. 30, 2009

(87) PCT Pub. No.: WO2008/043332
PCT Pub. Date: Apr. 17, 2008

(65) Prior Publication Data
US 2010/0067839 A1  Mar. 18, 2010

(30) Foreign Application Priority Data
Oct. 10, 2006 (DE) .......................... 10 2006 047 840

(51) Int. Cl.
*F16C 33/72* (2006.01)
*B60C 23/10* (2006.01)
(52) U.S. Cl. .................... 384/477; 152/417; 384/544
(58) Field of Classification Search .............. 384/477, 384/486, 544, 589; 152/417
See application file for complete search history.

(56) References Cited

U.S. PATENT DOCUMENTS

| | | | |
|---|---|---|---|
| 4,844,138 A | 7/1989 | Kokubu | |
| 6,896,413 B2 * | 5/2005 | Zavaglia et al. | 384/484 |
| 6,976,789 B2 * | 12/2005 | Pilone | 384/486 |
| 7,086,784 B2 * | 8/2006 | Ruetter et al. | 152/417 |
| 7,255,481 B2 * | 8/2007 | Mermoud | 384/486 |
| 7,625,127 B2 * | 12/2009 | Foti et al. | 384/484 |
| 7,815,193 B2 * | 10/2010 | Feistel et al. | 277/303 |

FOREIGN PATENT DOCUMENTS

| | | |
|---|---|---|
| DE | 11 09 470 A | 6/1961 |
| DE | 35 42 285 A | 8/1986 |
| DE | 40 29 311 | 3/1992 |
| DE | 103 23 449 | 12/2003 |
| DE | 103 24 410 A | 12/2003 |
| EP | 0 713 021 A | 5/1996 |

* cited by examiner

*Primary Examiner* — Thomas R Hannon
(74) *Attorney, Agent, or Firm* — Lucas & Mercanti, LLP

(57) ABSTRACT

The invention relates to a roller bearing of a wheel hub of a motor vehicle comprising a tire pressure control system. Said roller bearing comprises an air guiding channel that extends radially through an external ring and an air guiding channel that extends radially through an internal ring that leads into an intermediate chamber that is arranged between the rows of the bearing bodies and is sealed in relation to said bearing bodies. In order to seal the intermediate chamber in a more simple and effective manner, said intermediate chamber comprises a flow channel that is embodied as a Venturi nozzle.

20 Claims, 4 Drawing Sheets

ROLLER BEARING OF A WHEEL HUB WITH A VENTURI NOZZLE FOR A TIRE PRESSURE CONTROL SYSTEM

This application is a 371 of PCT/DE2007/001669 filed Sep. 15, 2007, which in turn claims the priority of DE 10 2006 047 840.1 filed Oct. 10, 2006, the priority of both applications is hereby claimed and both applications are incorporated by reference herein.

FIELD OF THE INVENTION

The invention relates to a roller bearing of a vehicle wheel hub with a tire pneumatic pressure control system, in which compressed air can be fed into at least one pneumatic tire through the roller bearing arranged on a rotating shaft, the roller bearing comprising an outer race and an inner race, arranged on the shaft, between which rows of rolling elements are arranged in raceways, an air ducting channel running radially through the outer race and an air ducting channel running radially through the inner race opening into an intermediate chamber arranged between the rows of rolling elements and sealed off from the latter, the intermediate chamber comprising two radially separated sub-chambers, of which a radially outer sub-chamber is connected to the outer race and a radially inner chamber to the inner race.

BACKGROUND OF THE INVENTION

In motor vehicles having tire pneumatic pressure control systems, as are disclosed in general terms by DE 40 29 311, A1, for example, the pneumatic pressure of vehicle pneumatic tires is controlled while underway by either delivering air to the tires or discharging air from these, so as to be able to influence the ride and handling of the vehicle. In this context, such systems either function autonomously or respond to the individual wishes of the driver, who via the pneumatic pressure of the tires, for example, can set the vehicle to a more sporting or a more comfortable driving mode. Such systems are also used in emergency running, that is to say in the event of damage to the tire leading to pressure losses, in order to compensate, at least temporarily, for such pressure losses.

For this purpose the air or another suitable medium, for example an inert gas, must be led from a pressure source through a rotor or stator element and delivered to the tire via a tire valve. In many cases the rotor or stator component is formed by the roller bearing of the wheel axle or of the wheel bearing. Such roller bearings with an air channel are disclosed, for example, by DE 103 23 449 A1, DE 103 24 410 A1 and U.S. Pat. No. 4,844,138.

In the technical solutions so far presented, sealing the intermediate chamber inside the roller bearing presents the greatest problems, which naturally applies to all rotor and stator systems, through which a hydraulic medium is to be led without losses. To improve the sealing, DE 103 24 410 A1 proposes an intermediate element, which is arranged in a divided bearing inner race, this rotating intermediate element possibly having air vanes. The intermediate chamber is sealed by means of two axially spaced and radially extending sealing elements, the sealing lips of which bear against the inner race. DE 103 23 449 A1 describes a similar solution having a one-piece inner race.

In U.S. Pat. No. 4,844,138 the intermediate chamber, which is substantially formed by a sub-chamber of the outer race extending from the outside radially inwards, is sealed by a permanent magnet arranged in the sub-chamber of the outer race and a magnetic fluid, which tightly seals a gap between webs of the upper sub-chamber and the inner circumferential surface of the inner race.

In the known solutions, in which seals with sealing lips are used, the strong contact pressure of the seal leads, under the pressure exerted, to a high moment of friction, which leads to a large power loss and hence to pronounced heating of the roller bearing. This can adversely affect the efficiency of the seal and the service life of the seal and of the roller bearing.

OBJECT OF THE INVENTION

The object of the invention is to create a roller bearing, which eliminates the outlined disadvantages. A particular object is to present a roller bearing of the type described in the introductory part, which will allow an efficient sealing of the intermediate chamber with little friction.

SUMMARY OF THE INVENTION

The invention is based on the finding that the stated object can be achieved in a surprisingly simple manner in that the intermediate chamber comprising two sub-chambers has a flow duct embodied as a Venturi nozzle, a seal gap being left between the sub-chambers.

The invention therefore proceeds from a roller bearing of a vehicle wheel hub with a tire pneumatic pressure control system, in which compressed air can be fed into at least one pneumatic tire through the roller bearing arranged on a rotating shaft, the roller bearing comprising an outer race and an inner race, arranged on the shaft, between which rows of rolling elements are arranged in raceways, an air ducting channel running radially through the outer race and an air ducting channel running radially through the inner race opening into an intermediate chamber arranged between the rows of rolling elements and sealed from the latter, the intermediate chamber comprising two radially separated sub-chambers, of which a radially outer sub-chamber is connected to the outer race and a radially inner chamber to the inner race.

Moreover, it is provided that the intermediate chamber has a flow duct embodied as a Venturi nozzle, each sub-chamber of the intermediate chamber being furnished with a cavity and a nozzle, the cavity being connected to an air ducting channel, and the nozzles of the sub-chambers being arranged radially in series so as to leave a seal gap and each having a diameter which is smaller than the diameter of the cavities.

This construction advantageously ensures that the pressure of the gas flowing through the roller bearing can be reduced to a minimum. An increase in the velocity of a flowing fluid, that is to say a gas or a liquid, is known to be accompanied by a fall in the pressure, a cross sectional narrowing of a flow duct giving rise to such an increase in the velocity of the gas flowing through the flow duct.

The nozzles of the sub-chambers arranged radially in series are separated from one another by a slight seal gap. Since the pressure is lowest at the point where the nozzles are situated, but the flow velocity is at its highest here, by far the greatest quantity of air flows radially through the nozzles. A minute quantity of air may pass into the seal gap, where it is evacuated to the interior of the bearing through established sealing systems.

One particularly advantageous effect of the development according to the invention is that the sub-chambers ensure a permanent distance from one another, so that no friction and hence also no wear can occur between these components, the sealing effect being ensured at minimal design cost.

At least one sub-chamber may also be integrally joined to the outer race or the inner race.

The roller bearing may also comprise a fixed outer race and an inner race rotating on the shaft, between which in particular two rows of rolling elements are arranged in the raceway. Alternatively, a roller bearing may also be provided with a rotating outer race and a fixed inner race.

In another practical development at least one sub-chamber may be embodied as a separate component, which is connected to the outer race or the inner race. In another development of the invention at least one sub-chamber is embodied as a nozzle ring.

It is also possible, without departing from the scope of the invention, for at least one nozzle ring to comprise a groove, which together with a groove in the circumferential surface of the outer race or the inner race forms the cavity. This development may be further supplemented in that at least one nozzle ring is integrally formed in one piece, or alternatively, in that at least one nozzle ring comprises two radially divided nozzle ring halves.

In an especially practical development of the invention at least one cavity has a larger diameter than the air ducting channel connected to the cavity. Alternatively, however, at least one cavity may have a diameter which is equal to the diameter of the air ducting channel connected to the cavity.

It is likewise possible, without departing from the scope of the invention, for at least one nozzle ring to be connected to the outer race or the inner race by a lug formed on to the nozzle ring, said lug sinking into a corresponding groove in the circumferential surface of the outer race or the inner race.

Outstanding features of other practical developments of the invention are that the seal gap is formed in a straight line or is embodied as a labyrinth of a labyrinth seal. This development may be still further supplemented in that the labyrinth is of V-shaped design.

The invention likewise encompasses the insertion of so-called flap valves into recesses in the nozzle rings, the flap valves axially defining and, if necessary, sealing the seal gap.

In another similarly practical development of the invention at least one sub-chamber of the outer race or the inner race is axially enclosed by radially extending seals having sealing lips, the sealing lips conforming to a circumferential surface of the radially opposing inner race or outer race.

This configuration may be further supplemented in that the seals are joined to the circumferential surface of the inner race or the outer race. However, the seals may also alternatively be molded onto a nozzle ring.

Finally, a development of the invention, distinguished by the fact that the nozzle rings are composed of a polymer material, in particular polyamide, polypropylene or polyester, is particularly advantageous.

One of the nozzle rings may preferably comprise the entire design shape of the Venturi nozzle and a further nozzle, which constitutes the transition to the bearing outer race, may be provided downstream of the cavity.

The seal gap is more preferably oriented in opposition to the preferred direction of flow and/or is sealed off from the grease chamber by sealing lips.

BRIEF DESCRIPTION OF THE DRAWINGS

The invention is explained in more detail below with reference to the drawing attached, in which.

DETAILED DESCRIPTION OF THE DRAWING

Figure 1:
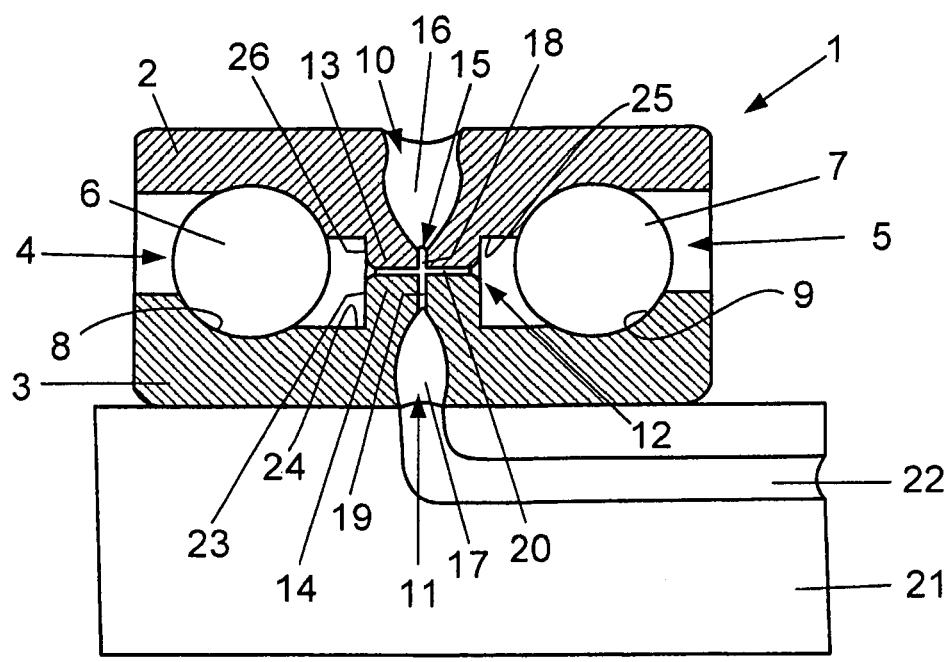
FIG. 1 shows a sectional view through a first exemplary embodiment of a roller bearing according to the invention.

FIGS. 1 to 6 each represent a radial section through a roller bearing 1 of a vehicle wheel hub (not shown) with a tire pneumatic pressure control system. In this context, the roller bearing 1 is designed in such a way that compressed air can be fed through this, so that a pneumatic tire (likewise not shown) of a vehicle wheel, which is connected to the respective axle, can be filled with air or the air let out.

The roller bearing 1 comprises a fixed outer race 2 and a rotating inner race 3 rotationally fixed on a shaft of the axle. Two rows 4, 5 of rolling elements 6 and 7, which are embodied as bearing balls, are arranged in raceways 8, 9 between the outer race 2 and the inner race 3 in a manner known in the art. The rolling elements 6, 7 in the rows 4, 5 are respectively supported in cages (not shown).

An air ducting channel 10 running radially through the outer race 2 and an air ducting channel 11 running radially through the inner race 3 open into an intermediate chamber 12 arranged between the rows 4, 5 of rolling elements 6, 7 and are sealed off from these. The intermediate chamber 12 in each case comprises two radially separated, radial web-like sub-chambers 13 and 14 respectively, the radially outer sub-chamber 13 being connected to or formed on to the outer race 2 and the radially inner sub-chamber 14 being connected to or formed on to the inner race 3.

The intermediate chamber 12 in each case comprises a flow duct embodied as a Venturi nozzle 15. For this purpose each of the sub-chambers 13, 14 of the intermediate chamber 12 is provided with a cavity 16 and 17 respectively and with a nozzle 18, 19, the cavity 16 of the sub-chamber 13 of the outer race 2 serving as downstream chamber being connected to the air ducting channel 10, and the cavity 17 of the sub-chamber 14 of the inner race 3 serving as upstream chamber being connected to the air ducting channel 11. The nozzles 18 and 19 of the sub-chambers 13 and 14 respectively are oriented in opposition to one another, leaving a narrow seal gap 20 and each have a diameter smaller than the diameter of the cavities 16 or 17.

As soon as air is pumped more or less abruptly through the roller bearing 1 for the purpose of filling the tire with air, the following happens:

Air or a comparable filling medium, such as an inert gas, first passes via the air ducting channel 11 of the inner race 3 into the cavity 17 of the sub-chamber 14. The subsequent narrowing of the diameter of the nozzle 19 causes the through-flow quantity of air introduced to increase abruptly, with the result that the pressure of the now rapidly flowing air simultaneously falls due to known laws of physics. The rapid air flow and the reduced pressure cause the greater quantity of air to flow into the nozzle 18 and only a minute quantity of air can escape through the seal gap 20.

The air now flowing through the nozzle 18 is reduced to a comparatively low flow velocity at relatively high pressure by the larger diameter of the cavity 16, which acts as diffuser so that the air can now again flow at high pressure to a tire valve, and can open the latter and flow into the tire. This function described above and components previously described are present in all embodiments according to FIGS. 1 to 5, the corresponding components of the roller bearing 1 for the sake of clarity being provided with reference numerals substantially only in Figure.

In the first exemplary embodiment represented in FIG. 1, the roller bearing 1 is arranged on a shaft 21, indicated only schematically, through which a conduit 22 is led, which is connected to a compressed air source and which opens into the air ducting channel 11 of the inner race 3. The air ducting channel 11 is widened towards the cavity 17 and opens into the nozzle 19 of the sub-chamber 14. This is integrally formed as a circumferential rim 23 onto the radially outer circumferential surface 24 of the inner race 3.

The outer race 2 is correspondingly provided on its radially inner circumferential surface 25 with an integrally formed rim 26, which forms the sub-chamber 13 of the outer race 2 and is likewise provided with the nozzle 18 and the cavity 16.

The seal gap 20 between the sub-chambers 13 and 14 and between the nozzles 18 and 19 is kept as narrow as possible, so that a flow loss through the seal gap can be minimized.

Further exemplary embodiments, in each of which the sub-chambers 13 and 14 are embodied as separate components and in which additional measures are provided for sealing off the seal gap 20, are represented in FIGS. 2 to 6. The sub-chambers 13 and 14 are in each case embodied as nozzle rings 27 and 28 of polymer material, which are connected by positive interlock or force closure to the outer race 2 and to the inner race 3. The cavities 16, 17 there are formed by grooves 29, 30 in the circumferential surfaces 25, 24 of the outer race 2 and the inner race 3 and by grooves 31, 32 in the nozzle rings 27, 28 corresponding to the grooves 29, 30. It is also possible, however, to arrange the cavities exclusively in the nozzle rings 27, 28.

Figure 3:
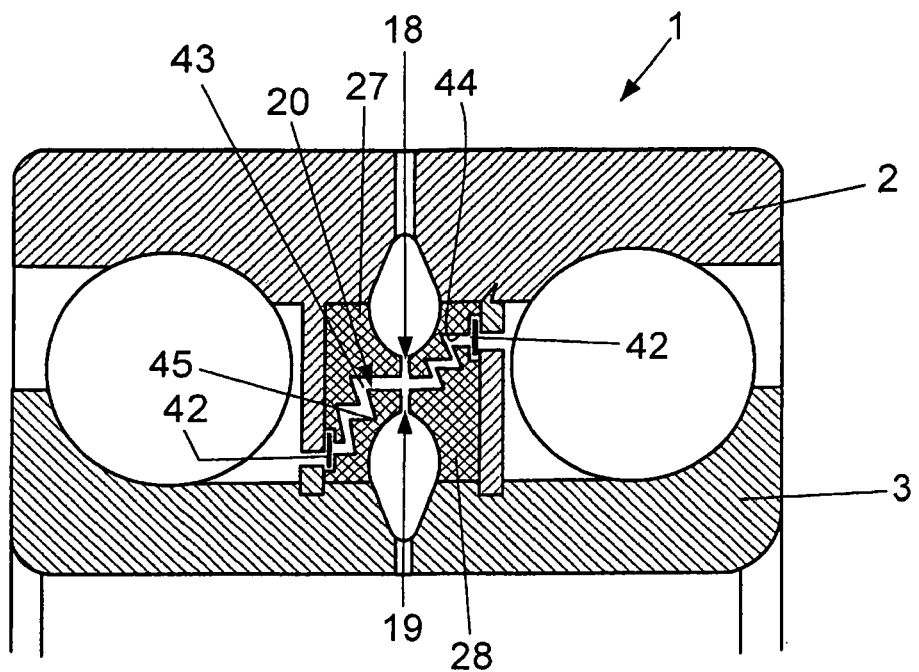
FIG. 3 shows a sectional view through a third exemplary embodiment of a roller bearing according to the invention.

As in the arrangement according to FIG. 1, the cavities 16, 17 and the radially inner sub-sections of the cavities 16, 17 formed by the grooves 31, 32 open into the nozzles 18 and 19, which for greater clarity are provided with reference numerals only in FIG. 3.

Figure 2:
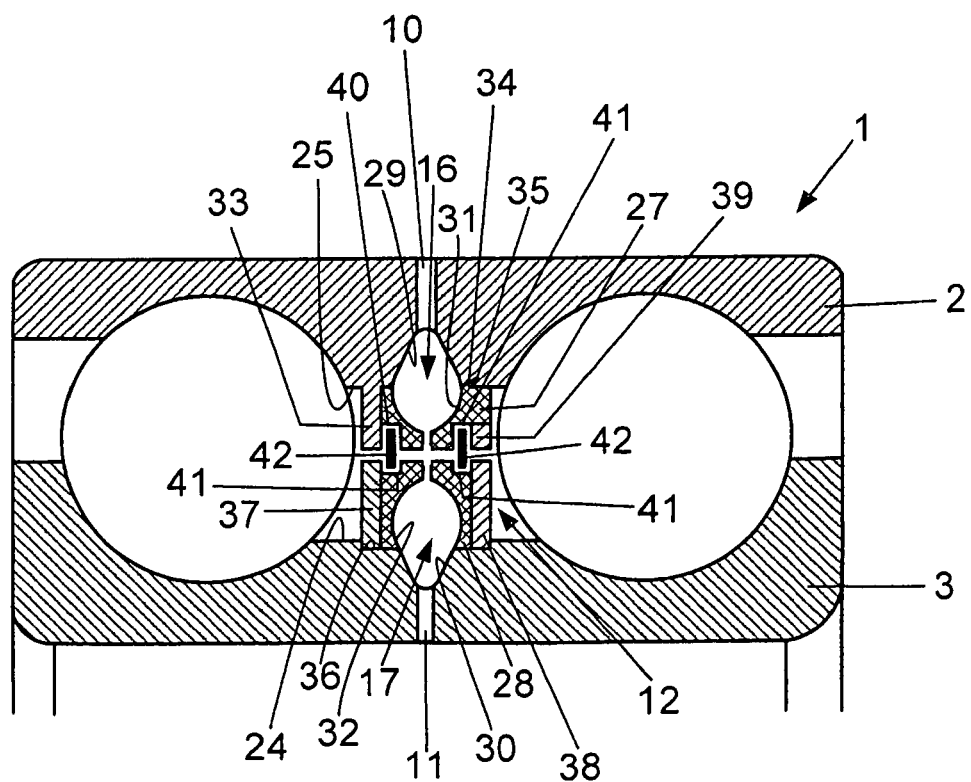
FIG. 2 shows a sectional view through a second exemplary embodiment of a roller bearing according to the invention.

In FIG. 2 the nozzle ring 27 of the outer race 2 is axially braced to the left against a fillet 33 integrally formed on the circumferential surface 25. The nozzle ring 27 is connected to the outer race 2 by a lug 34, which is formed on to the nozzle ring 27 and which sinks into a corresponding groove 35 into the circumferential surface 25 of the outer race 2.

The nozzle ring 28 of the inner race 3 is inserted into a groove 36 in the circumferential surface 24 of the inner race 3 and is axially held by lateral rings 37 and 38. These rings 37, 38 have a radial distance from the fillet 33 and a ring 39 connected to the nozzle ring 27, the distances in each case corresponding to the height of the seal gap 20.

Flap valves 42, which are embodied as loosely supported rings, are arranged in recesses 40, 41 of the nozzle rings 27, 28. When air flows out of the cavities 17 into the nozzle 19 and then into the area of the seal gap 20, the greater part of the air will flow on through the nozzle 18 into the cavity 16 opposite and through the air ducting channel 10 to the tire. A small quantity flows into the seal gap 20 to the flap valves 42, which are pressed against the fillet 40 and against the rings 37 to 39 or the fillet 33, thereby completely sealing off the intermediate chamber 12.

FIG. 3 represents a third exemplary embodiment of a roller bearing 1 according to the invention, which is similar to the roller bearing 1 represented in FIG. 2. In contrast to this, the seal gap 20 is embodied as a labyrinth 43. The nozzle rings 27 and 28 are accordingly of asymmetrical design with steps 44 and 45 corresponding to one another and through their interaction forming the labyrinth 43, which terminates at the radially offset flap valve 42.

Figure 4:
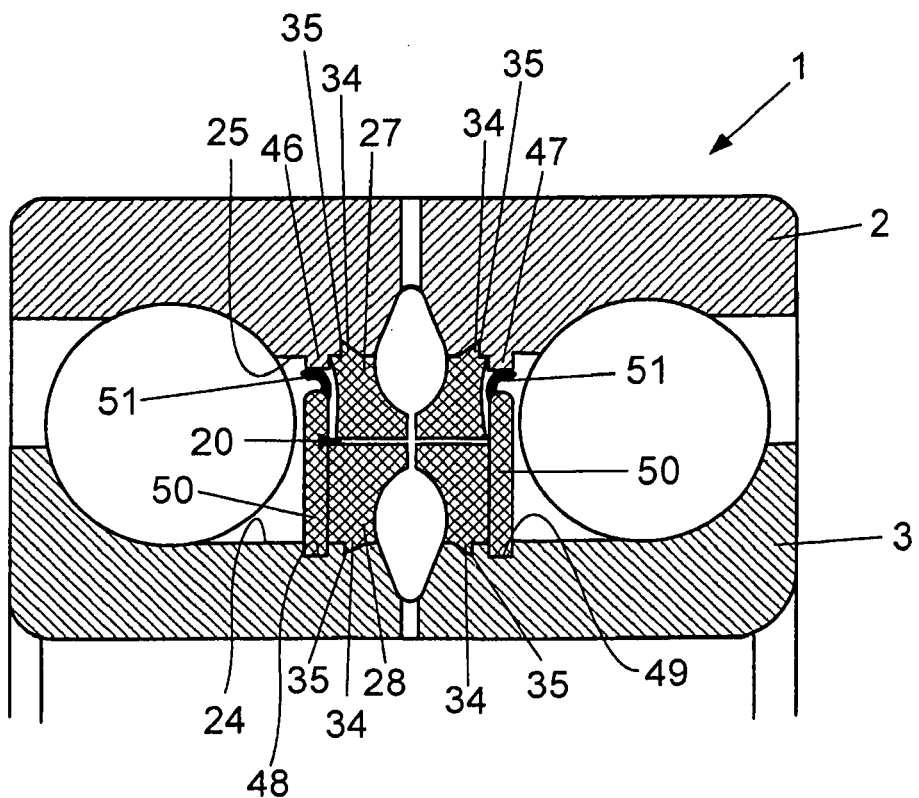
FIG. 4 shows a sectional view through a fourth exemplary embodiment of a roller bearing according to the invention.

FIG. 4 represents a fourth exemplary embodiment, in which the seal gap 20 runs axially and in a straight line between the nozzle rings 27, 28. The nozzle rings 27, 28 here each have lugs 34, which sink into corresponding grooves 35 in the circumferential surfaces 25 and 24 of the outer race 2 and the inner race 3 respectively. The nozzle ring 27 is fixed to the outer race 2 between rims 46, 47 integrally formed on the circumferential surface 25 of the outer race 2.

Seals 50 inserted into grooves 48, 49 in the circumferential surface 24 of the inner race 3 have radially terminal sealing lips 51, which conform to said rims 46, 47 on the outer race 2. The sealing lip 51 is in each case primarily intended to prevent bearing grease getting into the seal gap 20. Since the sealing lip 51 is at the very most subjected to only a slight quantity of air flowing through the seal gap 20 at low pressure, only a very slight moment of friction is generated, so that the sealing lip 51 is susceptible to virtually no wear.

Figure 5:
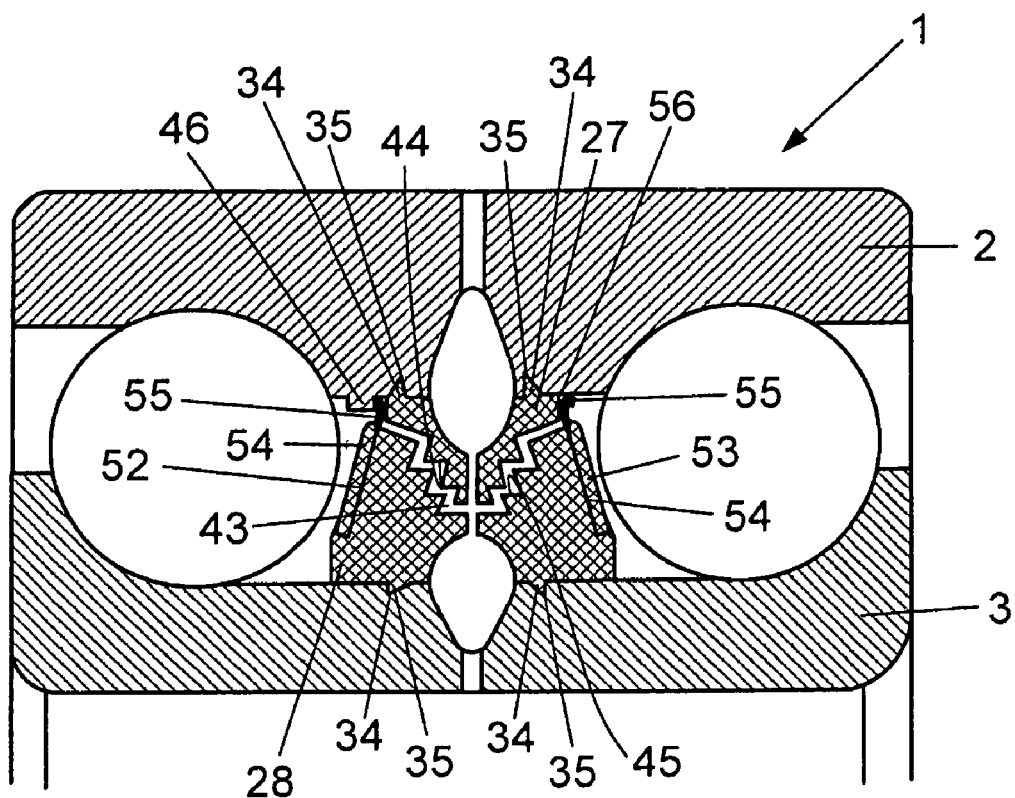
FIG. 5 shows a sectional view through a fifth exemplary embodiment of a roller bearing according to the invention.

FIG. 5 represents a fifth exemplary embodiment of a roller bearing 1 according to the invention, the nozzle rings 27, 28 of which are, like the nozzle ring 27, 28 in FIG. 3, also provided with steps 44, 45 to form a labyrinth 43 of a labyrinth seal. The nozzle rings 27, 28 according to FIG. 5, however, are in each case of symmetrical design, the nozzle ring 28 of the inner race 3 gripping at least partially around the nozzle ring 27 of the outer race 2 both axially and radially, so that in radial section a V-shaped labyrinth 43 is formed.

The nozzle rings 27, 28 likewise have lugs 34, which sink into grooves 35 of the outer race 2 and the inner race 3, so that assembly of the polyamide nozzle rings 27, 28 is extremely easy to accomplish. Besides polyamide, however, polypropylene or polyester may also be used as material for the nozzle rings 27, 28.

Seals 54 with sealing lips 55 are molded onto or into lateral faces 52, 53 of the nozzle ring 27, which is approximately trapezoidal in radial section. The sealing lips 55 conform to the rim 46 of the outer race 2 and to a lateral face 56 of the nozzle ring 28.

The nozzle rings 27, 28 in the embodiments according to FIGS. 2 to 4 are in each case formed in one piece. It is also possible, however, to form each of the nozzle rings 27, 28 from complementary ring halves. This affords the advantage of even easier assembly, in which the nozzle ring 27 or 28, comprising a left-hand and a right-hand half, for example, can then be pushed even more easily on to the associated bearing race, that is to say the outer race 2 or the inner race 3. The nozzle ring halves are then connected together or simply pushed against one another and each independently connected to the outer race 2 or the inner ace 3. The lugs 34 here facilitate easy latching of the nozzle ring halves to the outer race 2 and the inner race 3.

Figure 6:
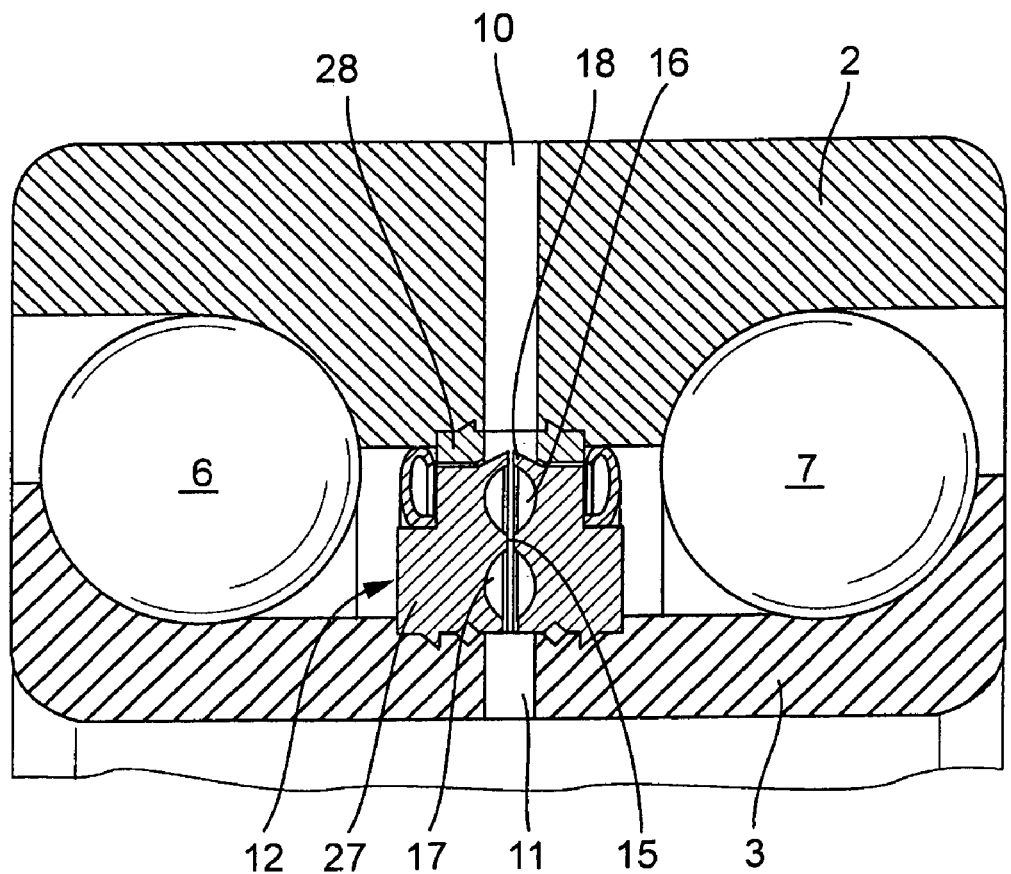
FIG. 6 shows a sectional view through a sixth exemplary embodiment of a roller bearing according to the invention.

FIG. 6 represents a sixth exemplary embodiment of the roller bearing 1 according to the invention, the nozzle ring 27 of which has the complete design shape of the Venturi nozzle 15. A further nozzle 18 is provided downstream of the cavity 16, which represents the transition to the bearing outer race 2.

LIST OF REFERENCE NUMERALS 1 roller bearing
2 outer race
3 inner race
4 row
5 row
6 rolling element 7 rolling element
8 raceway
9 raceway
10 air ducting channel
11 air ducting channel
12 intermediate chamber
13 radially outer sub-chamber
14 radially inner sub-chamber
15 Venturi nozzle
16 cavity
17 cavity
18 nozzle
19 nozzle
20 seal gap
21 shaft
22 conduit
23 rim
24 circumferential surface
25 circumferential surface
26 rim
27 nozzle ring
28 nozzle ring
29 groove
30 groove
31 groove
32 groove
33 fillet
34 lug
35 groove
36 groove
37 ring
38 ring
39 ring
40 recess
41 recess
42 flap valve
43 labyrinth
44 step
45 step
46 rim
47 rim
48 groove
49 groove
50 seal
51 sealing lip
52 lateral face
53 lateral face
54 seal
55 sealing lip
56 lateral face

The invention claimed is:

1. A roller bearing of a vehicle wheel hub with a tire pneumatic pressure control system, in which compressed air is fed into at least one pneumatic tire through the roller bearing arranged on a rotating shaft, the roller bearing comprising an outer race and an inner race arranged on the shaft, between the outer race and the inner race rows of rolling elements are arranged in raceways, an air ducting channel running radially through the outer race and an air ducting channel running radially through the inner race opening into an intermediate chamber arranged between the rows of rolling elements and sealed from the latter, the intermediate chamber comprising two radially separated sub-chambers, of which a radially outer sub-chamber is connected to the outer race and a radially inner sub-chamber is connected to the inner race, wherein the intermediate chamber has a flow duct embodied as a Venturi nozzle, each sub-chamber of the intermediate chamber being provided with at least one cavity and a nozzle, the cavity being connected to an air ducting channel, and the nozzles of the sub-chambers being arranged radially in series so as to leave a seal gap and each nozzle having a diameter which is smaller than the diameter of the cavities.

2. The roller bearing as claimed in claim 1, wherein at least one sub-chamber is integrally formed with the outer race or the inner race.

3. The roller bearing as claimed in at least claim 1, wherein at least one cavity has a larger diameter than the air ducting channel connected to the cavity.

4. The roller bearing as claimed in claim 1, wherein the cavity has a diameter which is equal to the diameter of the air ducting channel connected to the cavity.

5. The roller bearing as claimed in claim 1, wherein the seal gap is oriented in opposition to the preferred direction of flow and/or is sealed from a grease chamber by sealing lips.

6. The roller bearing as claimed in claim 1, wherein at least one sub-chamber of the outer race or the inner race is axially enclosed by radially extending seals having sealing lips, the sealing lips conforming to a circumferential surface of the inner race or the outer race.

7. The roller bearing as claimed in claim 6, wherein the seals are joined to the circumferential surface of the inner race or the outer race.

8. The roller bearing as claimed in claim 6, wherein the seals are molded onto a nozzle ring.

9. The roller bearing as claimed in claim 1, wherein at least one sub-chamber is embodied as a separate component, which is connected to the outer race or the inner race.

10. The roller bearing as claimed in claim 9, wherein the at least one sub-chamber is embodied as a nozzle ring.

11. The roller bearing as claimed in claim 10, wherein the nozzle ring comprises a groove, which together with a groove in a circumferential surface of the outer race or the inner race forms a cavity.

12. The roller bearing as claimed in claim 11, wherein the nozzle ring is integrally formed in one piece.

13. The roller bearing as claimed in claim 11, wherein the nozzle ring comprises two radially divided nozzle ring halves.

14. The roller bearing as claimed in claim 10, wherein the nozzle ring is connected to the outer race or the inner race by a lug formed on to the nozzle ring, the lug sinking into a corresponding groove in a circumferential surface of the outer race or the inner race.

15. The roller bearing as claimed in claim 10, wherein flap valves are inserted into recesses in nozzle rings, the flap valves axially defining and sealing the seal gap.

16. The roller bearing as claimed in claim 10, wherein the nozzle ring is composed of a polymer material.

17. The roller bearing as claimed in claim 10, wherein the nozzle ring comprises an entire design shape of the Venturi nozzle, and a further nozzle, which is provided downstream of the cavity, constitutes a transition to the outer race.

18. The roller bearing as claimed in claim 10, wherein the seal gap is formed in a straight line or as a labyrinth of a labyrinth seal.

19. The roller bearing as claimed in claim 18, wherein the nozzle ring is asymmetrical with steps corresponding to one another, the steps forming the labyrinth.

20. The roller bearing as claimed in claim 18, wherein the labyrinth is of V-shaped design.

* * * * *